(12) United States Patent
Doster et al.

(10) Patent No.: US 9,087,092 B2
(45) Date of Patent: Jul. 21, 2015

(54) LOGGING UPDATES TO MONITORED DATA SETS IN A STORAGE

(75) Inventors: Bard A. Doster, Tucson, AZ (US); Joel L. Masser, San Jose, CA (US); David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 13/609,164

(22) Filed: Sep. 10, 2012

(65) Prior Publication Data

US 2014/0075138 A1    Mar. 13, 2014

(51) Int. Cl.
G06F 12/00 (2006.01)
G06F 11/30 (2006.01)
G06F 11/34 (2006.01)
G06F 11/20 (2006.01)

(52) U.S. Cl.
CPC ........ *G06F 11/3034* (2013.01); *G06F 11/3072* (2013.01); *G06F 11/3079* (2013.01); *G06F 11/3476* (2013.01); *G06F 11/2087* (2013.01)

(58) Field of Classification Search
USPC .................................................. 711/161–162
See application file for complete search history.

(56) References Cited

U.S. PATENT DOCUMENTS

| | | | |
|---|---|---|---|
| 5,513,317 A * | 4/1996 | Borchardt et al. | 714/45 |
| 6,813,731 B2 | 11/2004 | Zahavi et al. | |
| 7,069,479 B2 | 6/2006 | Hester et al. | |
| 7,120,685 B2 | 10/2006 | Ullmann et al. | |
| 7,243,046 B1 * | 7/2007 | Patlashenko et al. | 702/183 |
| 7,904,757 B2 | 3/2011 | Nikkonen et al. | |
| 2002/0120815 A1 * | 8/2002 | Zahavi et al. | 711/118 |
| 2002/0198983 A1 * | 12/2002 | Ullmann et al. | 709/224 |
| 2005/0251633 A1 * | 11/2005 | Micka et al. | 711/162 |
| 2009/0300295 A1 | 12/2009 | Eccles et al. | |
| 2010/0077169 A1 * | 3/2010 | Pace | 711/165 |
| 2010/0318746 A1 * | 12/2010 | Troxel et al. | 711/141 |
| 2011/0072418 A1 | 3/2011 | Kalamegham et al. | |
| 2012/0017123 A1 | 1/2012 | Masser et al. | |

* cited by examiner

*Primary Examiner* — Gurtej Bansal
(74) *Attorney, Agent, or Firm* — David W. Victor; Konrad Raynes Davda & Victor LLP

(57) ABSTRACT

Providing a computer program product, system, and method for logging updates to monitored data sets in a storage. A request is received to monitor changes to a monitored data set comprising one of the data sets in the storage. A determination is made of tracks in the storage in which the data set is stored. The determined tracks are indicated in monitored tracks. Updates to the storage are received and a determination is made as to whether the updates are for the monitored tracks. The updates are logged in response to determining that updates are for the monitored tracks. A determination is made of new tracks added to the monitored data set and the determined new tracks are indicated in the monitored tracks.

25 Claims, 7 Drawing Sheets

LOGGING UPDATES TO MONITORED DATA SETS IN A STORAGE

BACKGROUND OF THE INVENTION

1. Field of the Invention

The present invention relates to a computer program product, system, and method for logging updates to monitored data sets in a storage.

2. Description of the Related Art

In certain computing environments, multiple host systems may configure data sets in volumes configured in a storage system, such as interconnected storage devices, e.g., a Direct Access Storage Device (DASD), Redundant Array of Independent Disks (RAID), Just a Bunch of Disks (JBOD), etc. Data sets are comprised of extents, which may comprise any grouping of tracks and data storage units. The Z/OS® operating system from International Business Machines Corporation ("IBM") has a Volume Table of Contents (VTOC) to provide information on data sets of extents configured in the volume, where the VTOC indicates the location of tracks, extents, and data sets for a volume in storage. For Virtual Storage Access Method (VSAM) data sets, the z/OS operating system provides VSAM volume data sets (VVDS) stored in a data set to provide information on VSM key sequenced data sets. (Z/OS is a registered trademark of IBM in the United States and other countries)

Data sets in volumes may occasionally be overlaid or damaged such that certain of the data sets are not usable even though other parts of the volume are valid. To diagnose data errors, traces may be set using a generalized trace facility (GTF), which logs all Input/Output (I/O) requests against a set of volumes to a log file. The logged data may then be analyzed after an error is detected to debug the error.

There is a need in the art for improved techniques to log data for error diagnosis.

SUMMARY

Providing a computer program product, system, and method for logging updates to monitored data sets in a storage. A request is received to monitor changes to a monitored data set comprising one of the data sets in the storage. A determination is made of tracks in the storage in which the data set is stored. The determined tracks are indicated in monitored tracks. Updates to the storage are received and a determination is made as to whether the updates are for the monitored tracks. The updates are logged in response to determining that updates are for the monitored tracks. A determination is made of new tracks added to the monitored data set and the determined new tracks are indicated in the monitored tracks.

DETAILED DESCRIPTION

Described embodiments provide techniques for logging updates to a specified data set, such that updates to monitored data sets are written to a log data set and available for later analysis. The user may further specify monitored strings, so that only updates to monitored data sets that include the monitored strings are written to a log file to provide more focused data logging. Further, with described embodiments, the tracks being monitored for monitored data sets are updated with new tracks added to a monitored data set, so the monitored tracks are dynamically updated based on new allocations of extents and tracks to monitored data sets.

Figure 1:
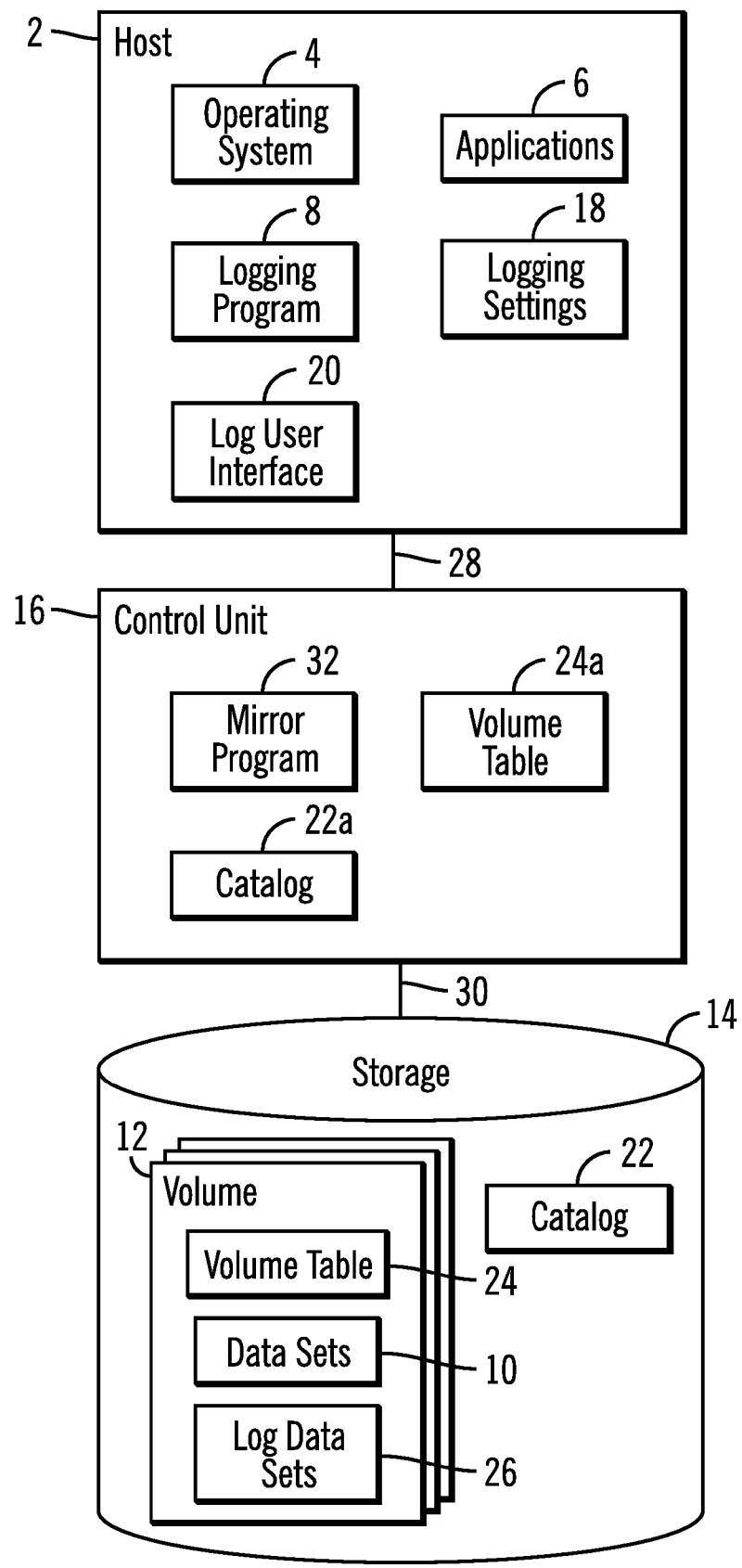
FIG. 1 illustrates an embodiment of a computing environment.

FIG. 1 illustrates an embodiment of a computing environment. A host 2 includes an operating system 4, applications 6, and a logging program 8 to log changes to data sets 10 in volumes 12 in a storage 14 accessible through a control unit 16, such as a storage controller or server. The logging program 8 maintains logging settings 18 providing information on data sets 10 to track for logging. The logging program 8 also generates a log user interface 20 to display to a user of the logging program 8 to allow the user to configure data sets to monitor for logging and to present logged updates for monitored data sets 10 for the user to review, along with log analysis tools enabling the user to analyze the logged data. The log user interface 20 may comprise a graphical user interface (GUI) or a command line interface. The logging program 8 stores logged data in log data sets 26 configured in the volumes 12.

The one or more applications 10 submit data requests to the operating system 8 that are sent to the storage 18. The host 2 may also receive data requests directed to the storage 14 from other systems that communicate with the host 2 via a network.

The control unit 16 manages access to the storage 14 by hosts, such as host 2. A catalog 22, stored in the storage 14 and loaded into the control unit 14 as catalog 22a to manage access to the data sets 10, provides information on data sets 10 stored in volumes 12 configured in storage space in the storage 14. A data set 10 comprises a collection of data intended to be stored in a same logical allocation of data, such as data from a single application, user, enterprise, etc. A data set 10 may be comprised of separate files or records, or comprise a single file or record. The data sets 10 may comprise indexed data sets that are indexed according to a primary key that is used to locate records in the data set 10. Data set indexes provide an index for each indexed data set 10. For instance, in IBM z/OS DFSMS implementations, the data set may comprise a Key Sequenced Data Set (KSDS) used in the IBM Virtual Storage Access Method (VSAM) storage, where each record in the KSDS data set has a unique key used to locate the record in the data set 10.

The control unit 16 includes a mirror program 32 to mirror updates to volumes 12 that are identified in mirror relationships to the host 2. The logging program 8 may request the control unit 16 to mirror updates to volumes that include the data sets being monitored.

Each volume 12 includes a volume table 24 having information on the volume 12, including a mapping of tracks and extents of tracks to data sets 10. The volume table 24 may be stored in the volume 16, such as in the first few records of the volume, as in the case of a volume table of contents (VTOC), or may be stored as metadata external to the volume 12. The control unit 16 may maintain copies of the volume tables 24a to use to manage the data sets 10 in the volumes 14. In z/OS implementations, the volume table 24 may include information on a location of data sets in the volume 12, such as a mapping of extents in the data set to storage locations in the volume. In alternative embodiments, the volume table 24 may comprise other types of file allocation data structures that provide a mapping of data to storage locations, either logical and/or physical storage locations. In this way, the volume table 24 provides a mapping of the data to data sets 10 in the volume 12. The volume table 24 may include volume table records for each volume 12, including a volume name and data set records indicating data sets having extents configured in the volume 12. Each data set record may have information for each data set 10 in a volume 12, including the one or more extents assigned to the data set 10. The extents 62 provide a mapping to tracks in the volume 12. The catalog 22 may further include additional information on the data sets allocated to the volumes 16, such as allocation sizes.

The host 2 may comprise a computational device known in the art, such as a workstation, mainframe, server, etc. The host 2 may communicate Input/Output (I/O) requests to the control unit 16 for the storage 14, such as a storage subsystem or server, such as an enterprise storage server, storage controller, etc., or other device used to manage I/O requests to attached volumes. The storage 14 may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The host 2 may communicate with the control unit 16 via connection 28 and the control unit 16 communicates with the storage 18 via connection 30. The connections 28 and 30 may comprise one or more networks, such as a Local Area Network (LAN), Storage Area Network (SAN), Wide Area Network (WAN), peer-to-peer network, wireless network, etc. Alternatively, the connections 28 and 30 may comprise bus interfaces, such as a Peripheral Component Interconnect (PCI) bus or serial interface. The operating system 4 may comprise suitable operating systems known in the art, such as the International Business Machines ("IBM®") z/OS® operating system. (IBM and z/OS are trademarks of IBM in the United States and foreign countries).

The operating system 4 receives data requests from the applications 6. The applications 6 may include middleware, access methods, and independent software vendor (ISV) products. Data sets may hold critical data. The host 2 may also receive I/O requests from applications on systems over a network.

Figure 2:
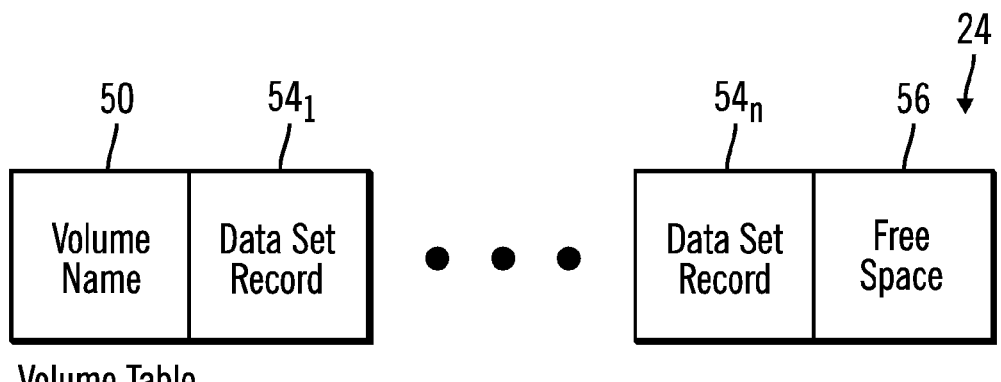
FIG. 2 illustrates an embodiment of a volume table.

FIG. 2 provides an embodiment of an arrangement of information maintained in an instance of a volume table 24 for one volume 12. The volume table 24 includes a volume name 50, also known as a volume serial number, e.g., a VOLSER, that provides a unique identifier of the volume. The volume name 50 may be included in the name of the volume table 24 in the volume 12. The volume table 24 instance further includes one or more data set records $54_1 \ldots 54_n$ indicating data sets having extents configured in the volume represented by the volume table 20. The volume table 24 further includes one or more free space records 56 identifying ranges of available tracks in the volume 12.

Figure 3:
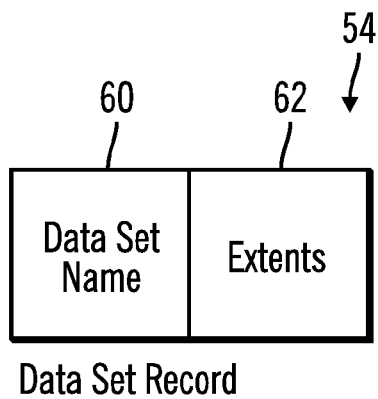
FIG. 3 illustrates an embodiment of a data set record.

FIG. 3 illustrates an embodiment of a data set record 54, such as the data set records $54_1 \ldots 54_n$ included in the volume table 24. Each data set record 54 includes a data set name 60 and one or more extents 62 allocated to the data set 54. The extent 62 provides a mapping to tracks in the volume 12 identified by the volume table 20. The tracks indicated in the map may be expressed as disk, cylinder, head and record location (CCHHR).

The reference numeral "n" used herein may refer to any number of instances of an element to which it is attached, and may refer to the same or different number of instances when used with different elements.

Figure 4:
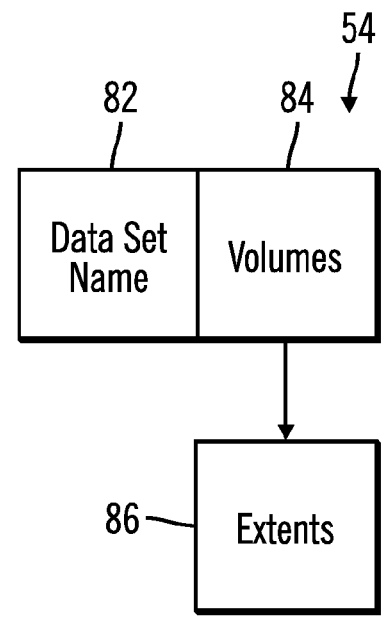
FIG. 4 illustrates an embodiment of a catalog entry.

The data set catalog 22 providing information on data sets having extents in one or more volumes 20. FIG. 4 illustrates an embodiment of a catalog entry 80 in the catalog 22, including a data set name 82 and one or more volumes 84 in which the data set 82 is allocated space. The volumes 84 may be listed in the order in which extents from the volume are assigned to the data set 82, and indicate base volume names or alias volume names. Each volume 84 would identity extents 86 in the volume that are assigned to the data set 82. The extents 86 for one volume 84 may be listed in the order in which they are allocated to the data set 82. The catalog 22 may be organized by a key comprising the data set name to allow searching on the data set name to obtain the entry 80 for a data set name.

When creating a data set 10, the operating system 4 or control unit 16 may create an entry 80 in the catalog 22. The operating system 8 may then locate a first volume and assign extents to the volume, and indicate the allocated extent 86 in the catalog entry 80 for the created data set 10. The volumes 84 would be used to assign further extents if the current extents assigned to the volume are full. Further, a new volume may be assigned to a data set if the current volumes assigned to the data set are full.

Figure 5:
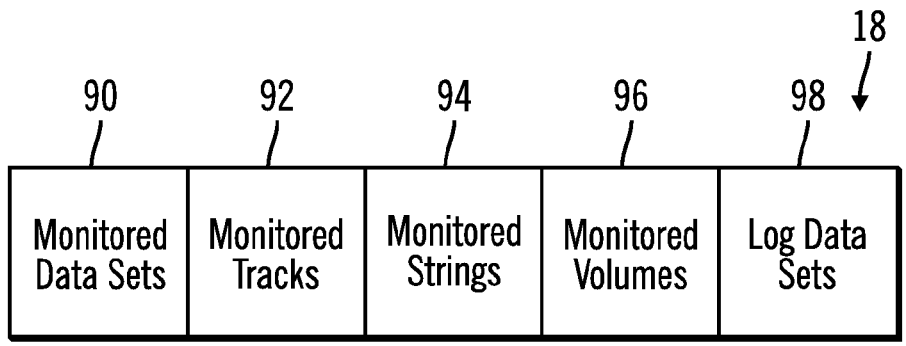
FIG. 5 illustrates an embodiment of logging settings.

FIG. 5 illustrates an embodiment of logging settings 18 the logging program 8 maintains, including monitored data sets 90 indicating data sets being monitored; monitored tracks 92 comprising tracks in the monitored data sets 90 being monitored; monitored strings 94 comprising strings to monitor for monitored data sets 90, where there may be different monitored strings for different data sets 90; monitored volumes 96 comprising volumes 12 in the storage 14 including the monitored data sets 90; and log data sets 98 identifying the log data sets 26 in storage 14 storing logged updates to monitored data sets 90 and tracks 92. In one embodiment, one log data set 26 may be used to store logged updated to monitored tracks 92 for all the monitored data sets 90 or there may be a separate log data set 26 dedicated to each monitored data set.

The monitored tracks may comprise any type of data unit being monitored, such as a track, logical block address (LBA), block, etc.

Figure 6:
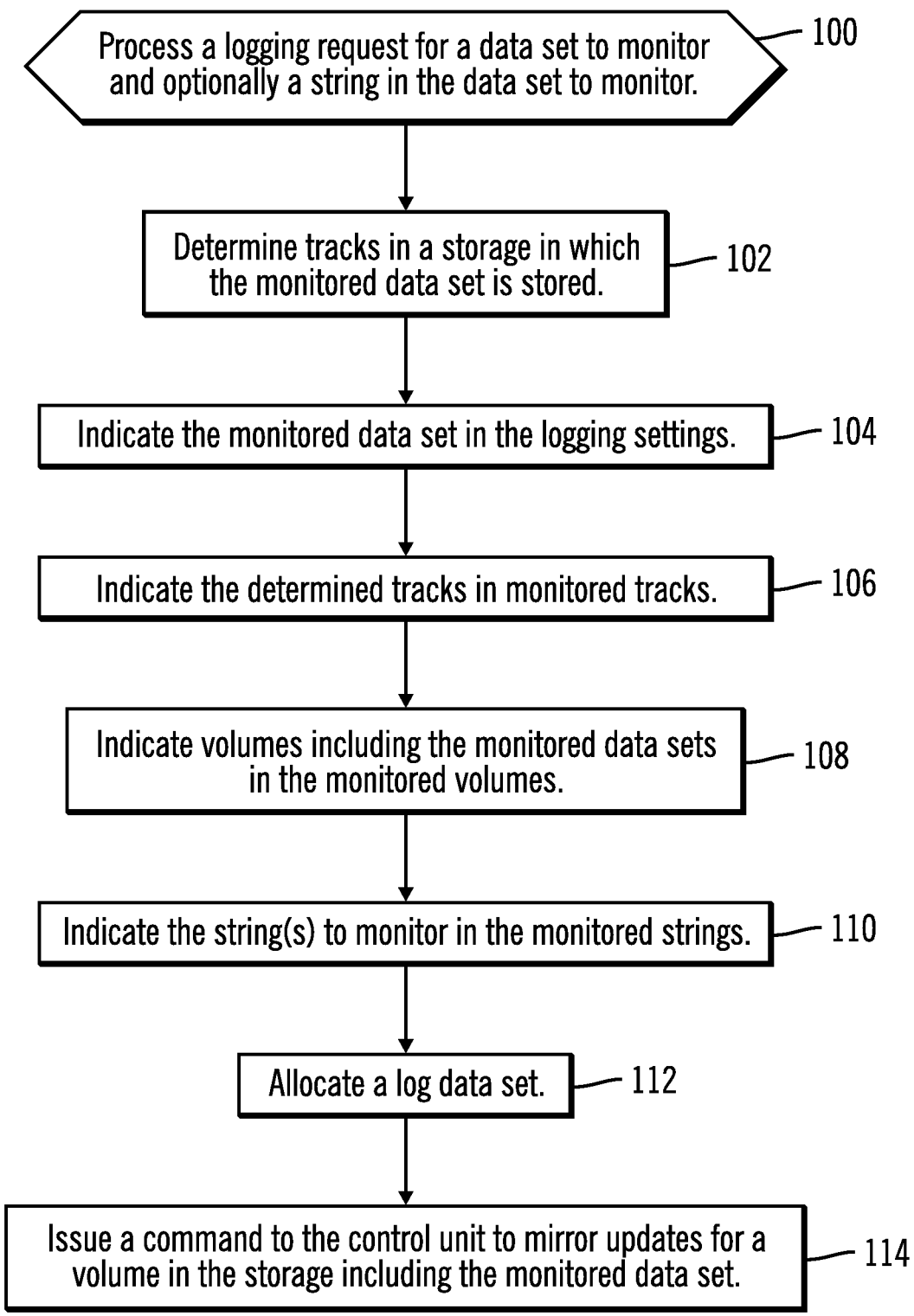
FIG. 6 illustrates an embodiment of operations to process a logging request.

FIG. 6 illustrates an embodiment of operations performed by the logging program 8 in response to a request by a user or program to monitor one or more data sets 10. In response to receiving (at block 100) the request to monitor one or more data sets 10 and, optionally, a string to monitor in the requested data sets, the logging program 8 determines (at block 102) tracks in the storage 14 in which the monitored data set(s) 10 are stored. The logging program 8 indicates (at block 104) in the monitored data sets 90 the requested data sets to monitor and indicates (at block 106) in the monitored tracks 92 the determined tracks to monitor. The logging program 8 may further indicate (at block 108) volumes 12 including the monitored data sets 90 in the monitored volumes 96.

In one embodiment, the logging program 8 may determine the monitored tracks 92 and monitored volumes 96 by first querying, directly or through the control unit 16, the catalog 22 to determine volumes 84 in which the monitored data sets 90 are included. For instance, the catalog 22 has an entry 80 for each data set name 82 indicating the volumes 84 in which the data set is included. These determined volumes 84 are then indicated in the monitored volumes 96. The logging program 8 may then process, directly or through the control unit 16, the volume table 24 for the determined volumes including the monitored data sets 90 to determine data set records $54_1 \ldots 54_n$ for the monitored data sets 90. From the determined data set records for the monitored data sets 90, the logging program 8 may then determine the extents 62 allocated to the monitored data sets 90 and then the tracks to which the determined extents 62 map. These tracks to which the determined extents 62 map comprise the monitored tracks 92.

If the logging request provided strings to monitor in one or more of the requested data sets to monitor, then the logging program 8 indicates (at block 110) the strings to monitor in the monitored strings 94. The request may alternatively not include strings to monitor and may only indicate data sets to monitor. The logging program 8 may then request from the control unit 16 an allocation (at block 112) of a log data sets 26 if none are available, and indicate any newly allocated log data sets 26 in the log data sets field 98 in the logging settings 18.

The logging program 8 may further issue (at block 114) a command to the control unit 16 to mirror updates for the one or more volumes in the storage 14 including the monitored data sets 90. This mirroring command would cause the mirror program 32 to setup a mirroring relationship to transfer any updates for the monitored volumes included in the mirror relationship to the host 2 and logging program 8. The updates to the monitored volumes 96 may include updates to the monitored data sets 90 as well as data sets 10 not being monitored that are stored in the mirrored volumes 12. In this way, the logging program 8 uses the facilities of a mirror program 32 to obtain updates to volumes that may include the monitored data sets 90.

The logging program 8 may further receive a request to monitor for new strings for currently monitored data sets 90. For instance, if an error is detected in one of the monitored data sets 90, the user or program may issue a request to the logging program 8 to include in the monitored strings 94 strings related to the detected error.

Figure 7:
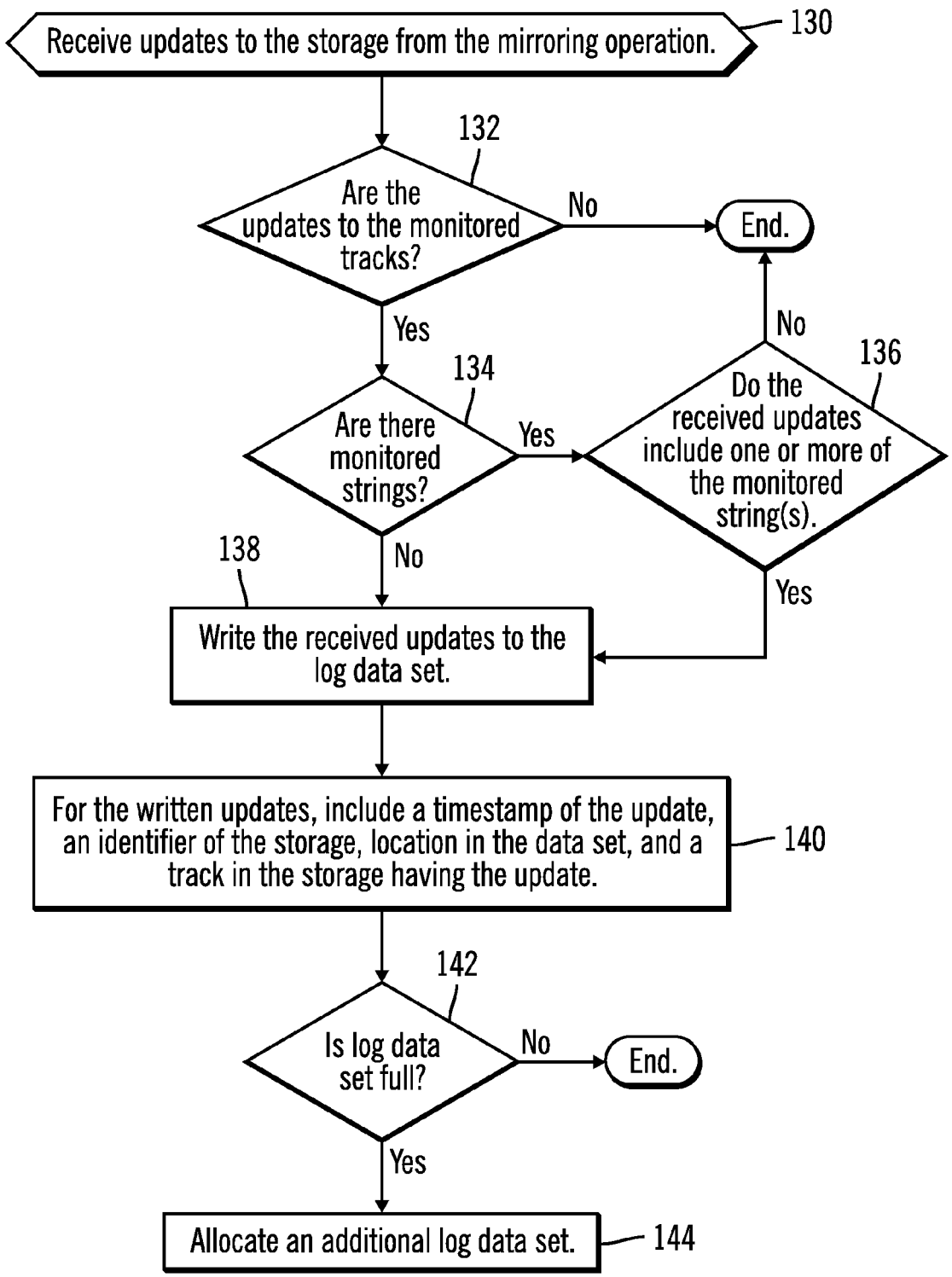
FIG. 7 illustrates an embodiment of operations to process updates to the storage for logging.

FIG. 7 illustrates an embodiment of operations performed by the logging program 8 to process updates to volumes 12 that the logging program 8 requested to mirror. Upon receiving (at block 130) updates to the data sets 10 in the storage 14 from the mirroring program 32, the logging program 8 determines (at block 132) whether the received updates are to the monitored tracks 92. If not, control ends, otherwise, if so, the logging program 8 determines (at block 134) whether there are monitored strings 94 specified for the monitored data set 90 including the monitored tracks 92 to which the updates apply. If (at block 134) there are monitored strings 94 specified, then the logging program 8 determines (at block 136) whether the received updates include one or more of the monitored string(s). If (from the no branch of block 134) there are no monitored strings 94 or after determining that the received updates include one or more monitored strings 94 (from the yes branch of block 136), the logging program 8 writes (at block 138) the received updates to the current log data set 26. The logging program 8 may further include (at block 140) for the written updates, a timestamp of the update, an identifier of the storage 14 to which the update is directed, a location in the data set 10 that is updated, such as a relative byte offset in the data set record, and a track in the storage 14 having the update. If (at block 142) the current log data set 26 being used is full, then the logging program 8 may request to the control unit 16 an allocation (at block 144) of an additional log data set. The allocated log data set 26 may be indicated in field 96 of the logging settings 18. Log data sets 26 may be allocated up to a user specified storage limit, after which log data wraps to start overwriting an oldest log data set.

Figure 8:
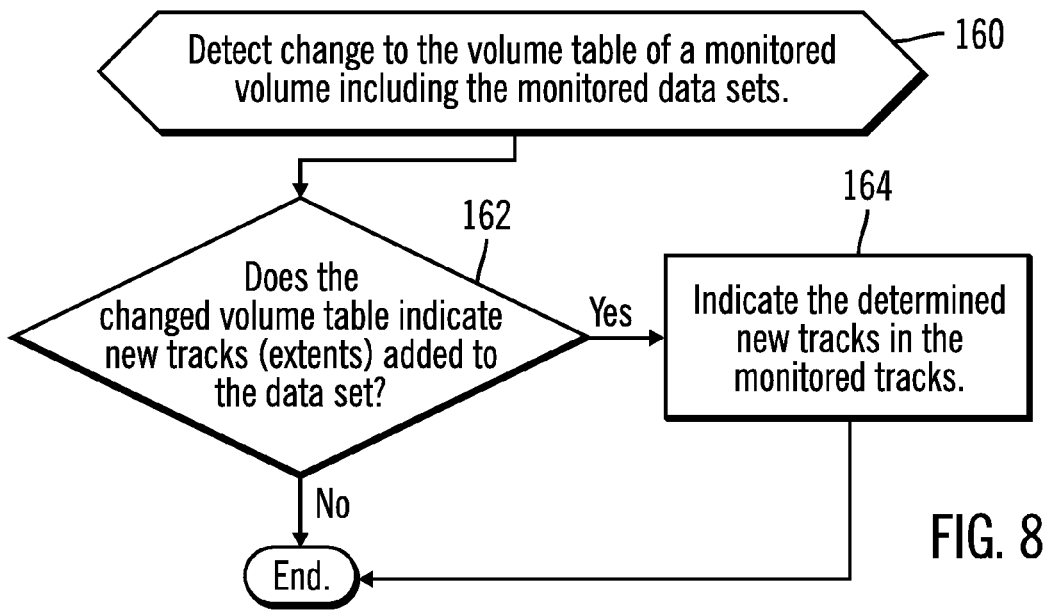
FIG. 8 illustrates an embodiment of operations to process detected changes to a monitored volume including monitored data sets.

FIG. 8 provides an embodiment of operations performed by the logging program 8 to update the monitored tracks 92 for a monitored data set 92 by monitoring changes to the volume table 24 for monitored volumes 96 including the monitored data sets 90. Upon detecting (at block 160) a change to the volume table 24 for a monitored volume 96 including the monitored data sets 90, the logging program 8 determines (at block 162) whether the changed volume table 24 indicates new tracks or extents added to a monitored data set 90. This may be determined by looking at the data set records 54 for the monitored data sets 90 included in the volume table 12 to see if there is a new extent 62 mapping to new tracks not indicated in the monitored tracks 92 for the monitored data set 90. If so, then the logging program 18 indicates (at block 164) the determined new tracks in the monitored tracks 92. Otherwise, control ends.

Figure 9:
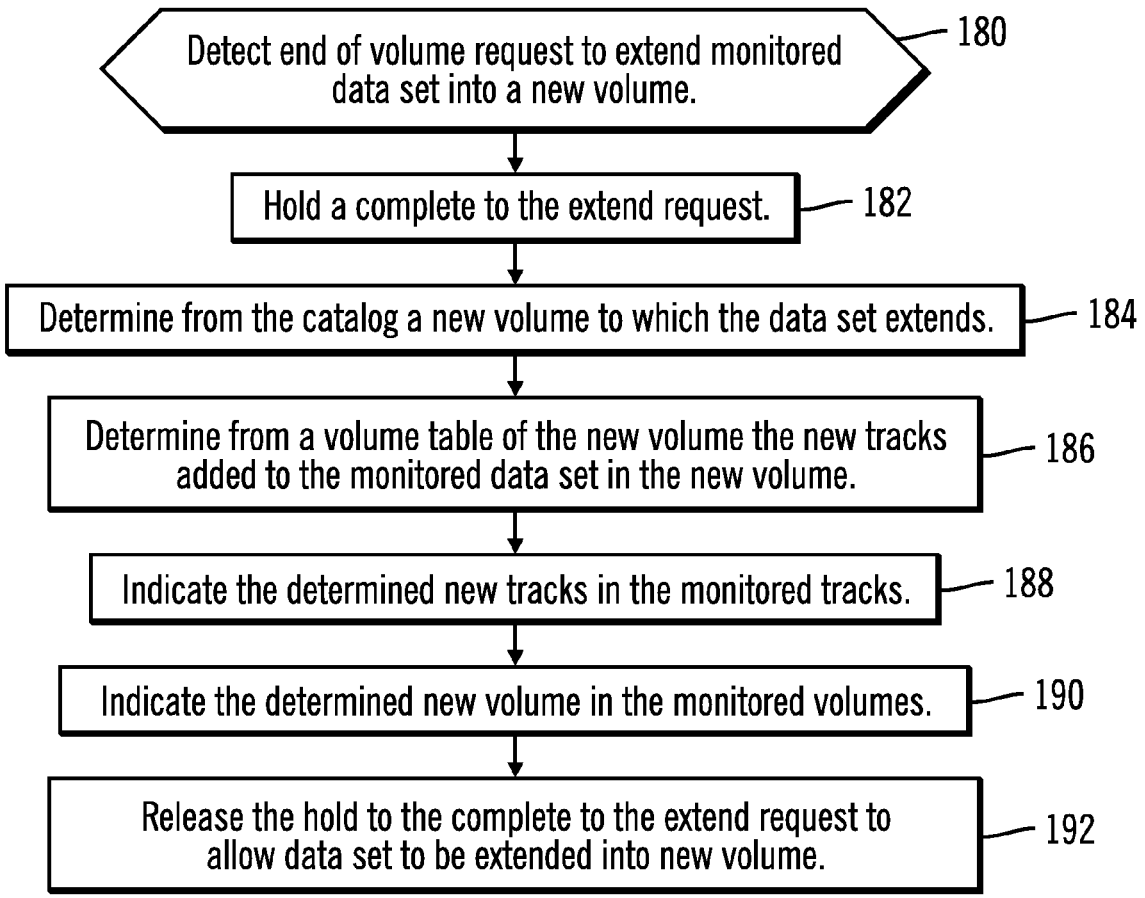
FIG. 9 illustrates an embodiment of operations to process an end of volume request to extend a monitored data set into a new volume.

FIG. 9 provides an embodiment of operations performed by the logging program 8 to detect new tracks added to a monitored data set 90 in a new volume allocated to a monitored data set 90. In certain embodiments, the host operating system 4 may issue an end of volume request or other similar command to extend a data set to a new volume if the current volume has no more free space for new extents to allocate to a data set. Upon detecting (at block 180) an end of volume request to extend a monitored data set 90 into a new volume 12, the logging program 8 issues (at block 182) a hold of a complete to the extend request to quiesce Input/Output (I/O) requests to the data set 10. The logging program 8 determines (at block 184) from the catalog 22 a new volume for the monitored data set for which the end of volume request was received. This new volume 84 may comprise a new volume 84 in the catalog entry 80 for the monitored data set 90. The logging program 8 determines (at block 186) from a volume table 24 of the new volume 12 the new tracks added to the monitored data set 90 in the new volume 12. For instance, the logging program 8 may look at the data set records $54_1 \ldots 54_n$ in the volume table 24 for the new volume to find the extents 62 in the data set record 54 the new volume provides for the monitored data set 60.

The logging program 8 indicates (at block 188) the determined new tracks in the monitored tracks 92 and indicates (at block 190) the determined new volume in the monitored volumes 96. The logging program 8 then releases (at block 192) the hold to the complete to the extend request to complete the extension of the monitored data set to the new volume and allow I/O to proceed against the monitored data set.

Figure 10:
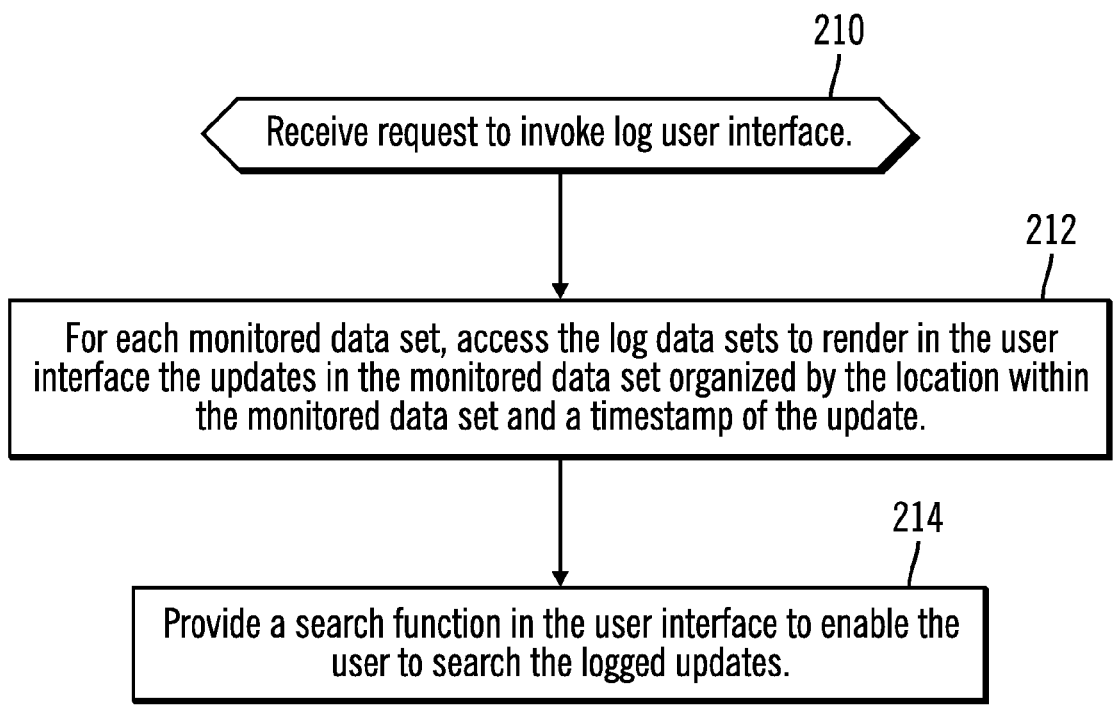
FIG. 10 illustrates an embodiment of operations to invoke a log user interface.

FIG. 10 illustrates an embodiment of operations performed by the logging program 8 to provide the log user interface 20 to a user of the logging program 8. Upon receiving (at block 210) a request to invoke the log user interface 20, for each monitored data set 89, the logging program 8 accesses (at block 212) the log data sets 26 to render in the log user interface 20 the updates in the monitored data sets 90 organized by the location within the monitored data sets 90, e.g., records and relative byte offsets, and a timestamp of the update. The log user interface 20 may further provide (at block 214) a search function in the user interface 20 to enable the user to search the logged updates by various parameters, such as time, data set name, strings in the logged updates, etc.

Figure 11:
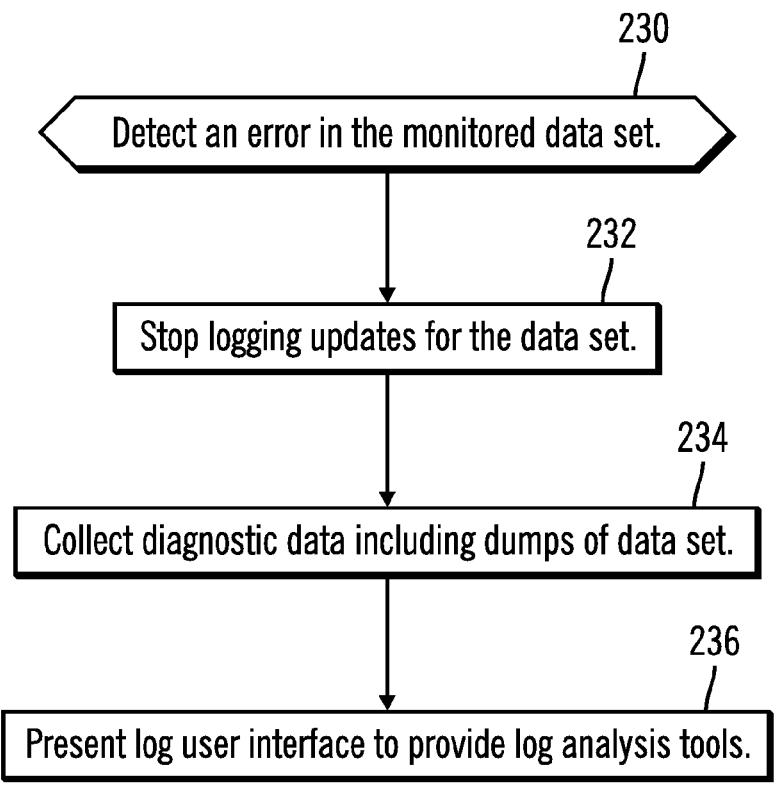
FIG. 11 illustrates an embodiment of operations to process a detected error to a monitored data set.

FIG. 11 illustrates an embodiment of operations performed by the logging program 8 to manage logging when an error is detected to one of the monitored data sets 90. Upon detecting (at block 230) an error to a monitored data set 90, the logging program 8 stops (at block 232) logging updates for the monitored data set 90 having the error. The logging program 8 may then collect (at block 234) diagnostic data, including dumps of the monitored data set 90 experiencing the error and present (at block 236) the log user interface 20 to provide log analysis tools to the user to use to analyze the log data.

For instance, if the logging is used to collect diagnostic data for a recreation attempt and a pattern for the corruption has been identified, then the logging program 8 can examine the updates for the pattern in order to detect the error very soon after the error is detected. If the logging program 8 detects an error during processing of the data set being monitored or is signaled by another program that an error has been detected, the logging program 8 may stop logging and may initiate collection of other type of diagnostic data, such as dumps. The log user interface 20 may provide a log analysis tool to provide user selectable functions to permit the user to filter the logged updates in the log data sets 26 and to search for specified updates. The log analysis tool may further provide a user-friendly format of the logged updates, including relating the storage address of the blocks to a record sequence number, Control Interval number, Relative Byte Address, and/or key as appropriate for the type of data set. The log user interface 20 may further permit searching forward for the next occurrence of a particular record, the next occurrence that indicates a change has taken place, or the next occurrence with a specified change in the data. The log user interface 20 may further allow for the blocks to be organized by their location within the data set. This allows the user to quickly visually scan a particular block, and observe every update that occurred to that block since the updates are displayed in chronological order.

Described embodiments provide techniques to specify data sets and optionally strings to monitor, so that the log data sets log updates to specified monitored data sets. Further, with described embodiments the tracks being monitored for monitored data sets are automatically updated with new tracks recently allocated to a monitored data set so that the monitored tracks remain current. Described embodiments reduce the amount of items recorded to the log file to only include specified likely relevant data. This more focused logging reduces computational overhead to manage the monitoring and logging, reduces the size of the log files storing logged data, and provides improved analysis and presentation of the logged data because updates for selected data sets of interest are logged, and other data sets not of interest may not be included in the log file.

Figure 12:
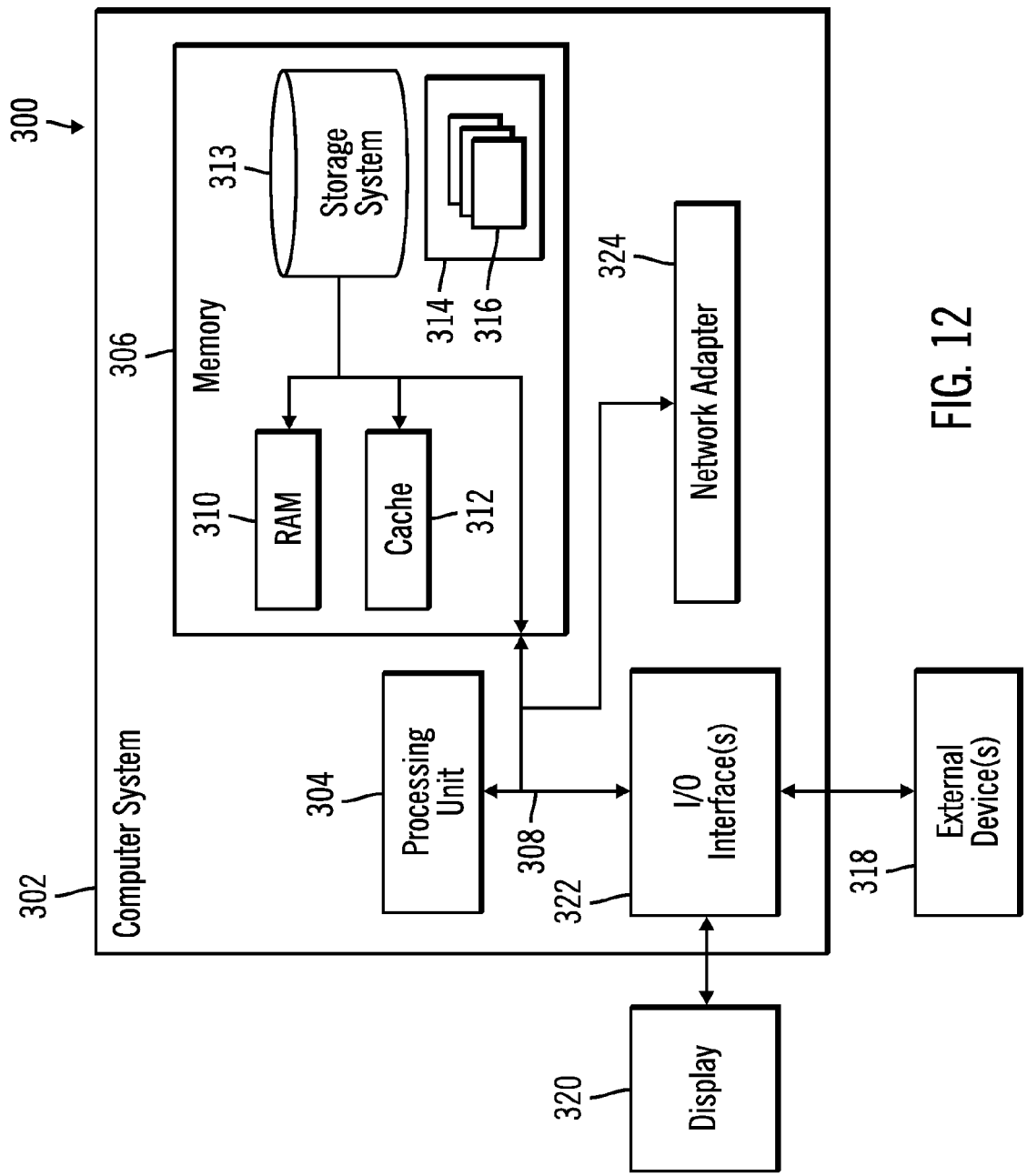
FIG. 12 illustrates a computing environment in which embodiments may be implemented.

FIG. 12 illustrates an embodiment of a computer system 302 which may comprise an implementation of the host 2 and control unit 16. Alternatively, the host 2 and control unit 16 may be implemented as a combination of hardware and/or software in the client 2. The host 2, control unit 16, and storage 14 may be implemented in a cloud computing environment in which the control unit 16 and storage 14 provide storage services to the host 2. Computer node 302 is only one example of a suitable computing node and is not intended to suggest any limitation as to the scope of use or functionality of embodiments of the invention described herein. Regardless, computer node 302 is capable of being implemented and/or performing any of the functionality set forth hereinabove.

The computer node 302 is operational with numerous other general purpose or special purpose computing system environments or configurations. Examples of well-known computing systems, environments, and/or configurations that may be suitable for use with computer node 302 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 302 may be described in the general context of computer system executable instructions, such as program modules, being executed by a computer system. Generally, program modules may include routines, programs, objects, components, logic, data structures, and so on that perform particular tasks or implement particular abstract data types. Computer node 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer node 302 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 302 typically includes a variety of computer system readable media. Such media may be any available media that is accessible by computer node 302, and it includes both volatile and non-volatile media, removable and non-removable media, and may be used for storing the programs and data used by the programs.

System memory 306 can include computer system readable media in the form of volatile memory, such as random access memory (RAM) 310 and/or cache memory 312. Computer node 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein, such as the operations of the logging program 8.

Computer node 302 may also communicate with one or more external devices 318 such as a keyboard, a pointing device, a display 320, etc.; one or more devices that enable a user to interact with the computer node 302; and/or any devices (e.g., network card, modem, etc.) that enable computer system/server 302 to communicate with one or more other computing devices. Such communication can occur via Input/Output (I/O) interfaces 322. Still yet, computer node 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for monitoring changes to data sets in a storage, the computer program product comprising a non-transitory computer readable storage medium having computer readable program code embodied therein that executes to perform operations, the operations comprising:

receiving a request to monitor changes to a monitored data set comprising one of the data sets in the storage, wherein each of the data sets are comprised of tracks in the storage;

determining tracks in the storage in which the monitored data set is stored;

indicating the determined tracks in monitored tracks;

receiving updates to the storage;

determining whether the updates are for the monitored tracks;

in response to detecting a change in the storage of tracks in the monitored data set, logging the updates in response to determining that updates are for the monitored tracks;

determining new tracks added to the monitored data set; and indicating the determined new tracks in the monitored tracks to update the tracks indicated in the monitored tracks being monitored.

2. The computer program product of claim 1, wherein the operations further comprise:

issuing a command to a control unit to mirror updates to a volume in the storage including the monitored data set, wherein the received updates comprise the updates mirrored from the control unit and include updates for monitored data sets in the mirrored volume in addition to the monitored data set.

3. The computer program product of claim 1, wherein the logging of the updates comprises copying the determined updates to the monitored tracks to a log data set, wherein the operations further comprise:

storing with the logged updates at least one of a timestamp of the update to the storage, an identifier of the storage, a track in the storage having the update, and a location in the monitored data set of the update;

providing a user interface to render the tracks in the monitored data set organized by the location within the monitored data set and a timestamp of the update, wherein multiple updates to one block have different timestamps; and providing a search function in the user interface to enable the user to search the logged updates.

4. The computer program product of claim 1, wherein the operations further comprise:

stopping the logging of the updates in response to detecting an error; and providing a log analysis tool to enable a user to analyze the logged updates in response to stopping the logging of the updates.

5. The computer program product of claim 1, wherein the operations further comprise:

receiving a request for a string to monitor in the monitored tracks;

indicating the received string as a monitored string;

wherein the determining whether the updates are for the monitored tracks comprises determining whether the updates to the monitored tracks include the monitored string, wherein the logged updates comprise the updates to the monitored tracks including the monitored string.

6. The computer program product of claim 5, wherein the requested string to monitor is identified by the user as related to previous occurrences of an error.

7. The computer program product of claim 1, wherein the determining of the tracks in the storage in which the monitored data set is stored comprises processing a catalog to determine at least one volume including the monitored data set and processing a volume table for the determined at least one volume to determine the tracks in the determined at least one volume including the monitored data set.

8. The computer program product of claim 7, wherein the determining the new tracks added to the monitored data set comprises:
determining from the volume table new tracks added to the monitored data set.

9. The computer program product of claim 7, wherein the determining the new tracks added to the monitored data set further comprises:
determining from the catalog a new volume to which the monitored data set extends; and
determining from a volume table of the new volume the new tracks added to the monitored data set in the new volume.

10. The computer program product of claim 7, wherein the operations further comprise:
detecting an end of volume request indicating that there is no more space on a current volume to allocate to the monitored data set;
determining from the catalog a new volume to which the monitored data set extends in response to detecting the end of volume request; and
determining from a volume table of the new volume the new tracks added to the monitored data set in the new volume.

11. The computer program product of claim 10, wherein the end of volume request includes an extend request to extend the monitored data set to the new volume, wherein the operations further comprise:
holding a complete to the extend request until the new tracks in the new volume are indicated in the tracks to monitor.

12. A system in communication with a storage having data sets, comprising:
a processor; and
a computer readable storage medium having computer code executed by the processor to perform operations, the operations comprising:
receiving a request to monitor changes to a monitored data set comprising one of the data sets in the storage, wherein each of the data sets are comprised of tracks in the storage;
determining tracks in the storage in which the monitored data set is stored;
indicating the determined tracks in monitored tracks;
receiving updates to the storage;
determining whether the updates are for the monitored tracks;
in response to detecting a change in the storage of tracks in the monitored data set, logging the updates in response to determining that updates are for the monitored tracks;
determining new tracks added to the monitored data set; and
indicating the determined new tracks in the monitored tracks to update the tracks indicated in the monitored tracks being monitored.

13. The system of claim 12, wherein the operations further comprise:
issuing a command to a control unit to mirror updates to a volume in the storage including the monitored data set, wherein the received updates comprise the updates mirrored from the control unit and include updates for monitored data sets in the mirrored volume in addition to the monitored data set.

14. The system of claim 12, wherein the logging of the updates comprises copying the determined updates to the monitored tracks to a log data set, wherein the operations further comprise:
storing with the logged updates at least one of a timestamp of the update to the storage, an identifier of the storage, a track in the storage having the update, and a location in the monitored data set of the update;
providing a user interface to render the tracks in the monitored data set organized by the location within the monitored data set and a timestamp of the update, wherein multiple updates to one block have different timestamps; and
providing a search function in the user interface to enable the user to search the logged updates.

15. The system of claim 12, wherein the operations further comprise:
receiving a request for a string to monitor in the monitored tracks;
indicating the received string as a monitored string;
wherein the determining whether the updates are for the monitored tracks comprises determining whether the updates to the monitored tracks include the monitored string, wherein the logged updates comprise the updates to the monitored tracks including the monitored string.

16. The system of claim 12, wherein the determining of the tracks in the storage in which the monitored data set is stored comprises processing a catalog to determine at least one volume including the monitored data set and processing a volume table for the determined at least one volume to determine the tracks in the determined at least one volume including the monitored data set.

17. The system of claim 16, wherein the determining the new tracks added to the monitored data set further comprises:
determining from the catalog a new volume to which the monitored data set extends; and
determining from a volume table of the new volume the new tracks added to the monitored data set in the new volume.

18. The system of claim 16, wherein the operations further comprise:
detecting an end of volume request indicating that there is no more space on a current volume to allocate to the monitored data set;
determining from the catalog a new volume to which the monitored data set extends in response to detecting the end of volume request; and
determining from a volume table of the new volume the new tracks added to the monitored data set in the new volume.

19. A method, comprising:
receiving a request to monitor changes to a monitored data set comprising one of a plurality of data sets in a storage, wherein each of the data sets are comprised of tracks in the storage;

determining tracks in the storage in which the monitored data set is stored;
indicating the determined tracks in monitored tracks;
receiving updates to the storage;
determining whether the updates are for the monitored tracks;
in response to detecting a change in the storage of tracks in the monitored data set, logging the updates in response to determining that updates are for the monitored tracks;
determining new tracks added to the monitored data set; and
indicating the determined new tracks in the monitored tracks to update the tracks indicated in the monitored tracks being monitored.

20. The method of claim 19, further comprising:
issuing a command to a control unit to mirror updates to a volume in the storage including the monitored data set, wherein the received updates comprise the updates mirrored from the control unit and include updates for monitored data sets in the mirrored volume in addition to the monitored data set.

21. The method of claim 19, wherein the logging of the updates comprises copying the determined updates to the monitored tracks to a log data set, further comprising:
storing with the logged updates at least one of a timestamp of the update to the storage, an identifier of the storage, a track in the storage having the update, and a location in the monitored data set of the update;
providing a user interface to render the tracks in the monitored data set organized by the location within the monitored data set and a timestamp of the update, wherein multiple updates to one block have different timestamps; and
providing a search function in the user interface to enable the user to search the logged updates.

22. The method of claim 19, further comprising:
receiving a request for a string to monitor in the monitored tracks;
indicating the received string as a monitored string;
wherein the determining whether the updates are for the monitored tracks comprises determining whether the updates to the monitored tracks include the monitored string, wherein the logged updates comprise the updates to the monitored tracks including the monitored string.

23. The method of claim 19, wherein the determining of the tracks in the storage in which the monitored data set is stored comprises processing a catalog to determine at least one volume including the monitored data set and processing a volume table for the determined at least one volume to determine the tracks in the determined at least one volume including the monitored data set.

24. The method of claim 23, wherein the determining the new tracks added to the monitored data set further comprises:
determining from the catalog a new volume to which the monitored data set extends; and
determining from a volume table of the new volume the new tracks added to the monitored data set in the new volume.

25. The method of claim 23, further comprising:
detecting an end of volume request indicating that there is no more space on a current volume to allocate to the monitored data set;
determining from the catalog a new volume to which the monitored data set extends in response to detecting the end of volume request; and
determining from a volume table of the new volume the new tracks added to the monitored data set in the new volume.

* * * * *